(12) United States Patent
Wellman et al.

(10) Patent No.: US 6,979,119 B2
(45) Date of Patent: Dec. 27, 2005

(54) SENSOR SYSTEM AND METHOD FOR SENSING IN AN ELEVATED-TEMPERATURE ENVIRONMENT, WITH PROTECTION AGAINST EXTERNAL HEATING

(75) Inventors: William H. Wellman, Santa Barbara, CA (US); Aldon L. Bregante, Santa Barbara, CA (US); Rao S. Ravuri, Goleta, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/427,408

(22) Filed: Apr. 30, 2003

(65) Prior Publication Data

US 2004/0218659 A1    Nov. 4, 2004

(51) Int. Cl.⁷ .......................... G01K 1/08; G01K 1/14; G01K 1/20; G01K 13/02
(52) U.S. Cl. ..................... 374/141; 374/135; 73/866.5
(58) Field of Search .................. 374/141, 29, 208, 374/135, 142, 148; 73/866.5

(56) References Cited

U.S. PATENT DOCUMENTS

| | | | | |
|---|---|---|---|---|
| 3,103,587 A | * | 9/1963 | Somers et al. ............... 250/352 |
| 3,604,930 A | * | 9/1971 | Allen ......................... 250/331 |
| 3,693,011 A | * | 9/1972 | De Vaux et al. ......... 250/370.01 |
| 3,785,096 A | * | 1/1974 | Neuhardt ..................... 52/79.4 |
| 4,658,251 A | * | 4/1987 | Bourrelly et al. ...... 340/870.17 |
| 4,659,236 A | * | 4/1987 | Hobbs ......................... 374/208 |
| 4,682,032 A | * | 7/1987 | Barrett ....................... 250/352 |
| 4,716,742 A | * | 1/1988 | Germain-Lacour et al. ... 62/51.2 |
| 4,740,702 A | * | 4/1988 | Huang et al. ............... 250/352 |
| 4,881,822 A | * | 11/1989 | Ridenour ................... 374/109 |
| 4,904,090 A | * | 2/1990 | Oliver ....................... 374/124 |
| 4,918,308 A | * | 4/1990 | Neitzel et al. .............. 250/352 |
| 5,054,936 A | * | 10/1991 | Fraden ....................... 374/164 |
| 5,152,610 A | * | 10/1992 | Hallett ....................... 374/156 |
| 5,179,283 A | * | 1/1993 | Cockrum et al. ........... 250/352 |
| 5,296,710 A | * | 3/1994 | Ohno et al. ................. 250/352 |
| 5,324,114 A | * | 6/1994 | Vinci ......................... 374/208 |
| 5,404,016 A | * | 4/1995 | Boyd et al. ................. 250/352 |
| 5,551,244 A | * | 9/1996 | Bailey ........................ 62/51.2 |
| 5,558,436 A | * | 9/1996 | Richards .................... 374/208 |
| 5,796,344 A | * | 8/1998 | Mann et al. ................ 340/583 |
| 6,254,008 B1 | * | 7/2001 | Erickson et al. .......... 236/44 A |
| 6,409,198 B1 | * | 6/2002 | Weimer et al. ........ 250/339.04 |
| 6,430,941 B1 | * | 8/2002 | Mordechai et al. .......... 62/51.2 |

(Continued)

FOREIGN PATENT DOCUMENTS

DE          3918245 A1 * 12/1990    ............ G01K 1/00

(Continued)

*Primary Examiner*—Gail Verbitsky
(74) *Attorney, Agent, or Firm*—William C. Schubert; Karl A. Vick

(57) ABSTRACT

Sensing in an elevated-temperature environment is provided using a sensor system having a sensor housing with an exterior wall with a window-support region having an outwardly facing external face, and a window through the window-support region of the exterior wall and affixed to the exterior wall. A sensor unit contained within the sensor housing receives an input signal through the window. A thermal-insulation layer is on the external face of the window-support region of the exterior wall at a location immediately adjacent to the window. The sensor system is operated in an environment wherein the window-support region of the exterior wall is heated to a temperature of greater than about 100° C. in the event that no thermal-insulation layer is present. In a typical application, the sensor system is attached to an aircraft such that the external face is in a forward-facing orientation, and the aircraft is operated such that the external face is heated by aerodynamic heating.

14 Claims, 3 Drawing Sheets

U.S. PATENT DOCUMENTS

| | | | |
|---|---|---|---|
| 6,581,387 B1 * | 6/2003 | Ullom | 62/3.1 |
| 6,644,849 B1 * | 11/2003 | Conner | 374/141 |
| 6,697,757 B2 * | 2/2004 | Eckel et al. | 702/130 |
| 2002/0122459 A1 * | 9/2002 | McFarland et al. | 374/179 |

FOREIGN PATENT DOCUMENTS

| | | | |
|---|---|---|---|
| EP | 1092966 | 4/2001 | |
| JP | 01032131 A * | 2/1989 | G01J 5/04 |

* cited by examiner

SENSOR SYSTEM AND METHOD FOR SENSING IN AN ELEVATED-TEMPERATURE ENVIRONMENT, WITH PROTECTION AGAINST EXTERNAL HEATING

This invention relates to sensor systems such as infrared sensor systems and more particularly, to a sensor system exposed to elevated temperatures during operation.

BACKGROUND OF THE INVENTION

An aircraft typically utilizes a number of sensors of different types. Many military aircraft and an increasing number of civilian aircraft have infrared sensors to detect potential threats such as missiles fired at the aircraft. The infrared sensor senses the presence of an infrared signature, such as that produced by the motor of a missile approaching the aircraft, and provides a warning so that countermeasures may be employed.

In one type of infrared sensor system, the sensor (detector) is operated at a reduced temperature to improve its performance. The reduced temperature may be produced in any manner, but it is typically produced by a small cryocooler that is integral with the sensor system inside its sensor housing. The cryocooler is operable to cool the sensor to temperatures of about 77 K or less. In other cases, the sensor may be cooled to about 180 K by means of a thermoelectric heat pump. However, all cryogenic coolers are limited in heat removal rate and in temperature differential. Cryocooler operation is handicapped and may become impossible as the heat load and external temperature increase.

In a typical case, the infrared sensor is a wide-angle sensor aimed in a fixed direction relative to the aircraft. For example, the sensor may be a forward facing sensor, an aft facing sensor, or a side-facing sensor. This arrangement minimizes the weight of the sensor system, by avoiding the use of an aiming system. Such minimization of the weight is highly desirable, because the weight of the infrared sensor must always be carried with the aircraft, even though the sensor system is actually required in some cases only a few times, or in some cases not at all, during the life of the aircraft. Additionally, and very importantly, the overall physical size ("envelope") of the sensor system must be maintained very small, because the sensor system is usually positioned on the aircraft at a location with an unobstructed view of the intended field of view, but which also has very little space available due to the aircraft's geometry and/or other instrumentation that must be similarly positioned.

The forward-facing sensor system faces directly, or nearly directly, into the airstream as the aircraft flies. Objects moving at high speeds through the atmosphere become heated when moving air comes to rest against the obstacle. For example, the high kinetic energy of the moving air is converted by frictional processes into potential energy in the form of high local temperatures and pressures. The local elevated temperature is termed the stagnation temperature. The value of the stagnation temperature increases sharply with aircraft speed. Even at a subsonic speed of 0.8 Mach, the stagnation temperature is 134° C. when the ambient air temperature is 90° C. The same 134° C. stagnation temperature is reached at 1.4 Mach when the ambient air temperature is a cooler 71° C. These are common military flight conditions.

Consequently, the forward-facing sensor system presents some challenging operational problems in situations where the aircraft flies sufficiently fast, such as at supersonic or near-supersonic speeds. In cases where the sensor system flies at such speeds for an extended period of time, the sensor system may be provided with a cryocooler with sufficient cooling power to maintain the reduced temperature of the sensor system during the extended period. However, where the aircraft attains these high speeds only for a short time, termed a "dash", sizing the cryocooler with sufficient cooling power for the transient heating that occurs during that short period typically results in significant penalties in weight, size envelope, and power consumption. The sensor system must be maintained operational during the dash, because the dash typically occurs in tactical situations where the sensor system is most necessary.

There is a need for an approach to providing cryocooled sensor systems operated in an elevated-temperature environment, without significantly increasing the weight of the sensor system. The present invention fulfills this need, and further provides related advantages.

SUMMARY OF THE INVENTION

The present invention provides a sensor system that is protected against elevated surface temperatures that would otherwise increase its interior temperature beyond its operating limits. The present approach is effective in a wide variety of elevated-temperature circumstances, but it is particularly valuable when the heating is produced in relatively brief transient conditions. The present approach results in negligible increases in both the weight and the size envelope of the sensor system, and no increase in its power consumption.

In accordance with the invention, a sensor system comprises a sensor housing having an exterior wall with a window-support region having an outwardly facing external face, and a window through the window-support region of the exterior wall and affixed to the exterior wall. In one design, the window-support region of the exterior wall comprises a segment of a mounting flange. A sensor unit is contained within the sensor housing and receives an input signal through the window. The sensor unit desirably comprises a sensor, preferably an infrared sensor, and a cryocooler that cools the sensor.

A thermal-insulation layer is on the external face of the window-support region of the exterior wall at a location immediately adjacent to the window but not overlying the window and the opening required for the window. The thermal-insulation layer is preferably a stand-alone piece of an insulating material, or it may be a coating. The thermal-insulation layer may comprise an organic material. A preferred thermal-insulation layer is a stand-alone piece of an insulating material comprising a fiberglass-epoxy composite material. The thermal-insulation layer is preferably at least about 0.020 inch thick, and most preferably at least from about 0.020 inch to about 0.060 inch. The thermal-insulation layer is affixed to the external face of the window-support region by any operable approach, but is preferably affixed with an adhesive layer. In this case, the insulation is made durable and applied to the exterior of the sensor system.

A method for sensing in an elevated-temperature environment comprises the steps of providing a sensor system of the type described herein, and operating the sensor system in an environment wherein the window-support region of the exterior wall is heated to a temperature of greater than about 100° C. in the event that no thermal-insulation layer is present. Operable features discussed elsewhere herein may be used with the method.

One preferred application is to attach the sensor system to an aircraft such that the external face is in a forward-facing orientation (i.e., facing in the direction of flight of the aircraft). The aircraft is then operated such that the external face is heated by aerodynamic heating. For the preferred application, the heating is a transient effect, occurring over a limited duration of time. A high-speed dash, a burst in flight speed that lasts no longer than about 10 minutes, is a typical transient condition. However, this period is sufficiently long to create significant heating of the sensor housing.

For many applications, it is desirable that the sensor housing have a physically small envelope, preferably a sphere having a diameter of no greater than about 4 inches. It is also desirable that the sensor housing and the sensor unit together weigh less than about 5 pounds. With this small size and weight, however, the sensor system has such a low thermal mass that transient temperature increases can overwhelm the steady-state cooling capacity. The present approach allows the sensor system to operate through such transient temperature increases and remain functional.

In the typical prior approach, those elements of the sensor system that are sensitive to heat are surrounded by insulating material and provided with some form of liquid, air, or other cooling. The approach described herein applies primarily to sensor systems for which such traditional active cooling approaches cannot be used. Specifically, in some cases the small size of the sensor system precludes the use of internal insulation. Active cooling such as liquid coolants or air flows cannot be used because of the small size, remote location on the aircraft, and absence of coolant supply lines or air-cooling conduits. The only path to remove heat is through the mounting flange to the aircraft frame. In some cases, the installation constraints force the mounting flange to be located near the front face of the sensor, preventing the use of conventional design approaches.

The present sensor system uses an external thermal-insulation layer that is compatible with the forces experienced in high-speed flight conditions, and also provides good insulation for the sensor unit from the temperatures experienced under these conditions. The sensor system may be implemented in any size of the sensor housing and total weight, but it is most beneficially applied when the sensor housing must be small, with a tightly constrained size envelope, and the total weight of the sensor housing and sensor unit must be small. The use of an interior insulation would require an increase in the interior volume, which is not acceptable. Further, the interior insulation may interfere with the cooling of the sensor unit and the removal of heat from the sensor unit to an exterior heat sink through the available heat-flow paths, in the preferred case the mounting flange by which the sensor system is affixed to the structure of the aircraft. It would also increase the heat loading on the heat flow paths to the heat sink. The exterior insulation, on the other hand, prevents heat from entering the sensor system in the first place, so that the burden on the heat-removal flow paths is not increased.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
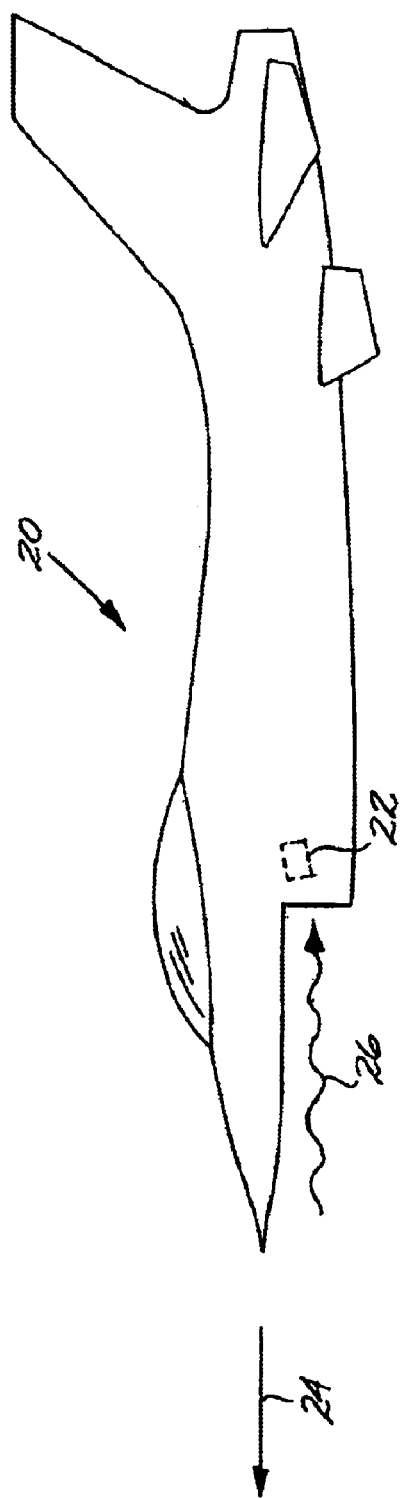
FIG. 1 is a schematic view of an aircraft with a forward-facing sensor system.

FIG. 1 schematically depicts an aircraft 20 (with the wing not shown so as not to obscure pertinent structure), and a preferred embodiment of a sensor system 22 affixed to the aircraft 20. The aircraft 20 flies in a direction of flight 24. The aircraft 20 may be a manned aircraft or an unmanned aircraft such as a missile. The aircraft 20 may be a military or a civilian aircraft. No limitation is known on the types of aircraft 20 that may be used. In the embodiment of FIG. 1, the sensor system 22 is fixed in a forward-facing orientation. That is, the sensor system 22 faces in the direction of flight 24 of the aircraft 20, so that it receives an input signal 26 generally from ahead of the aircraft 20.

Figure 2:
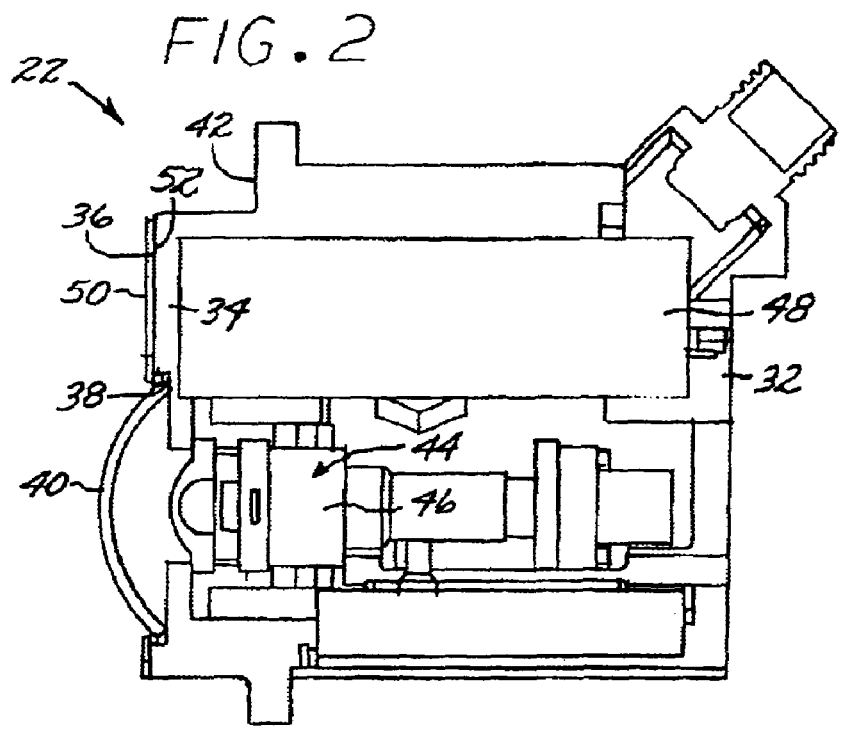
FIG. 2 is a schematic side sectional view of the sensor system.
Figure 3:
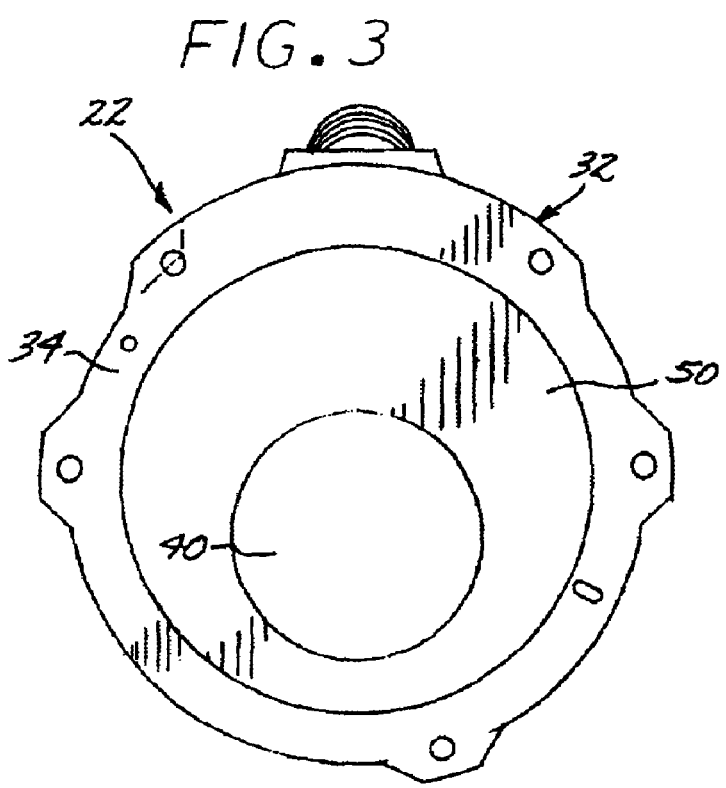
FIG. 3 is a schematic front elevational view of the sensor system.
Figure 4:
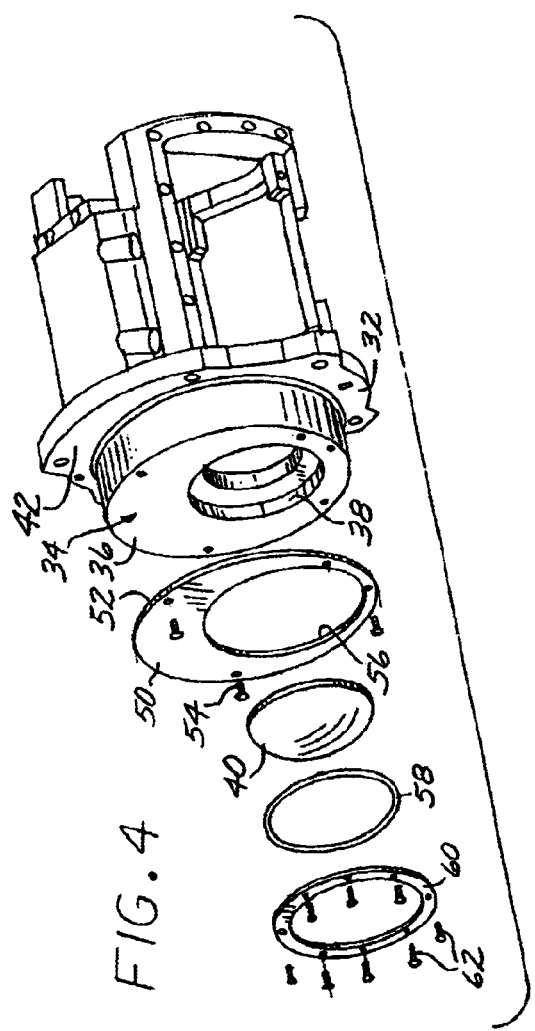
FIG. 4 is an exploded perspective view of the housing and the thermal-insulation layer of the sensor system.

FIGS. 2–4 illustrate the sensor system 22 in greater detail and in various views. The sensor system 22 is comprised largely of a sensor housing 30 having an exterior wall 32 that both supports and protects the internal components. The exterior wall 32 extends around most of the sensor system 22, and has a window-support region 34 having an outwardly facing external face 36. An opening 38 extends through the window-support region 34 of the exterior wall 32. A window 40 covers the opening through the window-support region 34 and is affixed to the exterior wall 32. The illustrated window 40 is an outwardly bulging dome.

The exterior wall 32 may be a monolithic body, but more typically it includes several different segments. In the preferred embodiment, a mounting flange 42 adapted to attach the remainder of the sensor unit 22 to the aircraft 20 forms a segment of the exterior wall 32. The mounting flange 42 constitutes the sensor aiming or boresight reference, and therefore is made structurally contiguous with the sensor housing 30 and the exterior wall 32, in order to assure accurate optical alignment. For this application, the mounting flange 42 provides a conductive cooling path from the sensor system 22, which is a further reason for making it contiguous with the sensor housing 30. When the sensor system 22 is in normal operation, its internally generated heat is removed through the mounting flange 42 into a large sensor mounting bracket that is a part of the aircraft 20 in which the sensor system 22 is installed. The mounting flange 42 is set back from the external face 36 such that it can connect to internal aircraft structure that has a more steady temperature than the external environment met by the external face 36, and serves as the heat sink for the sensor system 22. Thus, as shown, the mounting flange 42 is integrated with, or monolithic with, the exterior wall 32, and also forms part of an endwall in which the window-support region 34 is located.

A sensor unit 44 is contained within the sensor housing 30 and receives the input signal 26 through the window 40. The sensor unit 44 includes a sensor 46, preferably an infrared sensor, and a cryocooler 48. In the preferred embodiment, the sensor 46 must be cooled to a reduced temperature, such as a cryogenic temperature of 77 K or lower, so that it may function properly and optimally. The cryocooler 48 cools the sensor 46. The cryocooler 48 is an electrically powered device that produces the reduced temperature using a thermodynamic cycle with a self-contained gaseous working fluid, and therefore does not require the addition of a coolant before each mission. Sensors 46 operating in various wavelength ranges and operable cryocoolers 48 are known in the art.

A thermal-insulation layer 50 is affixed to the external face 36 of the window-support region 34 of the exterior wall 32 at a location immediately adjacent to the window 40. The thermal-insulation layer 50 is preferably a stand-alone piece of an insulating material that is separately fabricated and then affixed to the external face 36, or it may be a coating that is applied to the external face 36. The thermal-insulation layer 50 is preferably conformably shaped to the external face 36. The thermal-insulation layer 50 has a thickness of at least about 0.020 inch, preferably from about 0.020 inch to about 0.060 inch, and most preferably from about 0.030 inch to about 0.050 inch. If the thermal-insulation layer 50 has a thickness of less than about 0.020 inch, it has insufficient thermal insulating capability. The layer may be thicker than 0.060 inch, but the additional insulating capability has little further benefit, and the additional thickness increases the effective size and volume, and the weight, of the sensor unit 22.

The thermal-insulation material of the thermal-insulation layer 50 must withstand the forces of the airstream, which may reach supersonic velocity, and it must have a sufficient insulating capability. Preferably, the thermal-insulation material has a thermal conductivity per square inch of less than about 0.1 watt per degree Centigrade. For example, for a 20 minute duration of high external temperature on the order of about 130° C., this low thermal conductivity limits the temperature rise of the sensor housing 32 to less than about 5 degrees, because the thermal inertia of the sensor frame can absorb the resulting small incoming heat flow for this short duration. In addition, for longer durations, this value of insulation reduces the heat flow to a level that can be conducted outward through the sensor mounting flange 42, without significantly increasing the heat flow into the rest of the sensor housing 32 and the sensor unit 44. Such blocking of the heat influx protects the internal sensor components that are mounted to the to the mounting flange 42 by the sensor frame, including such temperature-sensitive components as the cryocooler 48, the sensor 46, and the internal electronics. Additionally, the thermal-insulation material has good resistance to damage by objects driven against it by the airstream, such as dust particles, other particles, raindrops, and the like. It is also desirable that the thermal-insulation material be of a relatively low density.

A presently preferred thermal-insulation material for use in the thermal-insulation layer 50 includes an organic material, most preferably an epoxy. A most preferred thermal-insulation material is a fiberglass-epoxy composite material made of unidirectional or multidirectional fiberglass fibers embedded in an epoxy matrix.

The thermal-insulation layer 50 is preferably affixed to the external face 36 of the window-support region 34 with an adhesive layer 52. The adhesive layer 52 may be of any type operable with the selected thermal-insulation layer 50 and with the material of the window-support region 34. A preferred adhesive layer 50 for use with a fiberglass-epoxy thermal-insulation layer and an aluminum alloy construction of the external face 36 of the window-support region 34 is an epoxy such as a heat-curing epoxy. There thermal-insulation layer 50 may be affixed to the external face 36 with additional or alternative means, such as mechanical fasteners.

FIG. 4 shows the manner of assembly and affixing of the thermal-insulation layer 50 and the window 40 to the window-support region 34 of the exterior wall 32. The adhesive layer 52 and a set of bolt mechanical fasteners 54 fasten the thermal-insulation layer 50 to the window-support region 34. The thermal-insulation layer 50 has an opening 56 therethrough, positioned and sized so that the window 40 may be independently and separately attached and affixed therethrough to the window-support region 34 using a resilient ring 58, a metallic retainer 60, and bolt mechanical fasteners 62.

Figure 5:
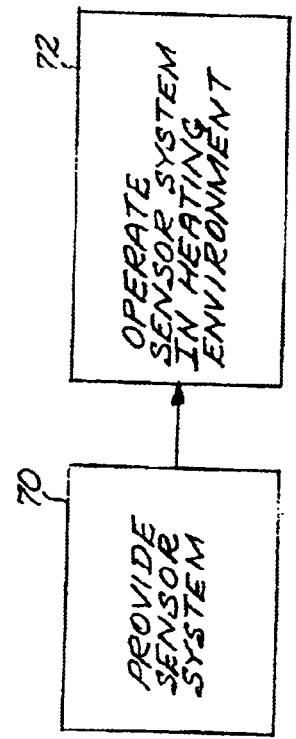
FIG. 5 is a block diagram of a preferred approach to utilizing the present invention.

A method for sensing in an elevated-temperature environment is illustrated in FIG. 5. The method provides a sensor system 22 of the type discussed elsewhere herein, step 70. The sensor system 22 is operated in an environment wherein the window-support region 34 of the exterior wall 32 is heated to a temperature of greater than about 100° C. in the event that no thermal-insulation layer 50 is present, step 72. If its temperature exceeds about 100° C., the sensor 46 does not perform properly.

A preferred application involves attaching the sensor system to the aircraft 20 such that the external face 36 and the window 40 face in a forward-facing orientation parallel to the direction of flight 24. In this forward-facing orientation, the sensor system 22 faces directly into the airstream. When the aircraft 20 flies through the air in the direction of flight 24, the window-support region 34 is heated by aerodynamic heating and friction as a result of the impact and friction of the air as it moves rapidly past the aircraft 20.

It is preferable that the sensor housing 30 have a physically small envelope, preferably in the form of a sphere of no greater than about 4 inches diameter. It is also desirable that the sensor housing and the sensor unit together weigh less than about 5 pounds. These size and weight constraints are established in light of the aircraft application. On the other hand, when the sensor system 22 is small and light, it has little thermal mass and thermal inertia that aid it in maintaining its temperature under conditions of a thermal transient such as experienced during the dash phase of an aircraft mission. The present approach is particularly advantageously employed in this circumstance to minimize the temperature increase experienced by the sensor 46, which must be maintained within its temperature limits for proper operation.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sensor system comprising a structure affixed to an aircraft in a forward facing orientation, wherein the structure affixed to the aircraft includes:
 a sensor housing having
  an exterior wall with a window-support region having an outwardly facing external face, wherein the window-support region of the exterior wall comprises a segment of a mounting flange adapted to attach the remainder of the sensor unit to the aircraft, and
  a window through the window-support region of the exterior wall and affixed to the exterior wall;
 a sensor unit contained within the sensor housing and receiving an input signal through the window, wherein the sensor unit comprises
  an infrared sensor, and
  a cryocooler that cools the sensor; and a thermal-insulation layer affixed to the external face of the window-support region of the exterior wall at a location immediately adjacent to the window, wherein the thermal-insulation layer is a stand-alone piece of an insulating material affixed to the external face of the window-support region with an adhesive layer.

2. The sensor system of claim 1, wherein the thermal-insulation layer is a stand-alone piece of an insulating material.

3. The sensor system of claim 1, wherein the thermal-insulation layer is a stand-alone piece of an insulating material comprising an organic material.

4. The sensor system of claim 1, wherein the thermal-insulation layer is a stand-alone piece of an insulating material comprising a fiberglass-epoxy composite material.

5. The sensor system of claim 1, wherein the sensor housing is affixed to the aircraft such that the exterior face and the window are in a forward-facing orientation.

6. A method for sensing in an elevated-temperature environment, comprising the steps of
providing a sensor system comprising:
a sensor housing having
an exterior wall with a window-support region having an outwardly facing external face, and
a window through the window-support region of the exterior wall and affixed to the exterior wall,
a sensor unit contained within the sensor housing and receiving an input signal through the window, and
a thermal-insulation layer on the external face of the window-support region of the exterior wall at a location immediately adjacent to the window; and
operating the sensor system in an environment wherein the window-support region of the exterior wall is heated to a temperature of greater than about 100° C. in the event that no thermal-insulation layer is present, wherein the step of operating the sensor system includes the step of
attaching the sensor system to an aircraft such that the external faces is in a forward-facing orientation.

7. The method of claim 6, wherein the step of providing the sensor system includes the step of
providing the sensor housing wherein the window-support region of the exterior wall comprises a segment of a mounting flange.

8. The method of claim 6, wherein the step of providing the sensor system includes the step of
providing the sensor unit comprising
a sensor, and
a cryocooler that cools the sensor.

9. The method of claim 6, wherein the step of providing the sensor system includes the step of
providing the thermal-insulation layer as a stand-alone piece of an insulating material.

10. The method of claim 6, wherein the step of providing the sensor system includes the step of
providing the thermal-insulation layer as a stand-alone piece of an insulating material comprising an organic material.

11. The method of claim 6, wherein the step of providing the sensor system includes the step of
providing the thermal-insulation layer as a stand-alone piece of an insulating material comprising a fiberglass-epoxy composite material.

12. The method of claim 6, wherein the step of providing the sensor system includes the step of
affixing the thermal-insulation layer to the external face of the window-support region with an adhesive layer.

13. The method of claim 6, wherein the step of providing the sensor system includes the step of
providing the sensor unit comprising an infrared sensor.

14. The method of claim 6, wherein the step of operating the sensor system includes the step of
operating the aircraft such that the window-support region is heated by aerodynamic heating.

* * * * *